3,396,195
PROCESS FOR MAKING 2,6-DICHLORO-4-NITROANILINE

Melvin J. Visser, Portage, Mich., assignor to The Upjohn Company, Kalamazoo, Mich., a corporation of Delaware
No Drawing. Filed Oct. 11, 1965, Ser. No. 494,932
10 Claims. (Cl. 260—578)

ABSTRACT OF THE DISCLOSURE 2,6-dichloro-4-nitroaniline is prepared by chlorinating 4-nitroaniline with chlorine in ethylene dichloride containing sufficient water to absorb the hydrogen chloride as it is formed.

BACKGROUND OF THE INVENTION 2,6-dichloro-4-nitroaniline is a known compound, useful among other things, as a plant fungicide. It has been prepared heretofore by chlorinating p-nitroaniline in hydrochloric acid. This process has the disadvantage of producing relatively small crystals of 2,6-dichloro-4-nitroaniline which are difficult to filter. The prior art process also requires an excess of chlorine, excessively large reactors, produces a wet filter cake, and presents problems in regard to handling of the reaction mixture.

The chlorination of 4-nitroaniline in a non-aqueous solvent system is complicated by the formation of an intermediate 2-chloro-4-nitroaniline, this compound being relatively insoluble in most solvents, either in the free base form or the form of the hydrochloride which is formed by interaction of the free base with the hydrogen chloride of the reaction. Precipitation of the 2-chloro-4-nitroaniline hydrochloride during the reaction greatly slows down the rate of reaction and impairs the yield of the desired 2,6-dichloro-4-nitroaniline. Furthermore, efforts to accelerate the chlorination in such case have proved undesirable because of the chlorination of the solvent. This is undesirable because of the relative insolubility of 2-chloro-4-nitroaniline in the more highly chlorinated solvents.

BRIEF DESCRIPTION OF THE INVENTION

It has now been found that these disadvantages are avoided by using ethylene dichloride as the non-aqueous solvent and continuously absorbing the hydrogen chloride of the reaction in water as it is formed. It has been found that ethylene dichloride is an excellent solvent for the intermediate 2-chloro-4-nitroaniline and that precipitation of 2-chloro-4-nitroaniline hydrochloride can be minimized or completely prevented by continuously absorbing the hydrogen chloride formed in the reaction in water as it is formed.

In carrying out the process of the invention, the chlorination can advantageously be effected by dissolving 4-nitroaniline in ethylene dichloride, adding water to the reaction mixture, and passing chlorine into the reaction mixture at the chlorination temperature.

DETAILED DESCRIPTION OF THE INVENTION

Sufficient water should be incorporated in the reaction mixture to absorb the hydrogen chloride formed in the reaction as it is formed. Any greater amounts can be used but are ordinarily undesirable because of the increased load placed upon the equipment in handling the larger volume of reaction medium and in-process solutions. Since the amount of hydrogen chloride formed in the reaction is proportional to the 4-nitroaniline used, the amount of water advantageously is related to the amount of 4-nitroaniline. Advantageously, this ratio is maintained such that the hydrochloric acid solution formed by the absorption of the hydrogen chloride of the reaction in the water has a concentration approximating that of the constant boiling mixture; that is, about 20%. Smaller amounts of water such as will produce hydrochloric acid solutions of up to about 25% hydrogen chloride can sometimes advantageously be used, but such amounts of water as produce hydrochloric acid concentrations essentially higher than this should be avoided, especially where the concentration of 4-nitroaniline in the ethylene dichloride is high. Ordinarily it will be sufficient if the weight ratio of water to 4-nitroaniline is between about 2:1 and about 4:1, but more desirably is between about 2.4:1 and about 2.9:1.

The amount of ethylene dichloride is not critical and can be varied widely. However, it is desirable to use sufficient ethylene dichloride to hold all of the 2,6-dichloro-4-nitroaniline formed in solution at the final temperature of the chlorination, ordinarily the reflux temperature of the reaction mixture, about 76° C. This makes it possible to decant or otherwise separate the two phases while retaining all of the 2,6-dichloro-4-nitroaniline in the ethylene dichloride phase. For this purpose, the concentration of 4-nitroaniline in the ethylene dichloride should not exceed about 80 g./liter (about 6% solution). Any lower concentration can be used. Ordinarily, however, it will not be necessary for the concentration of 4-nitroaniline in ethylene dichloride to be less than about 0.5%. Higher concentrations, i.e., less ethylene dichloride, can be used, especially if other means, such as distillation, is used to remove the water phase. For this purpose the reaction mixture is distilled with the continuous or periodic addition of ethylene dichloride, which, if desired, is recycled from the distillate, until all of the water and hydrogen chloride are distilled, and the residue, a solution or slurry of the product, treated to recover the product, as for example, by cooling to effect crystallization and filtering. This procedure has the advantage that higher concentrations of 4-nitroaniline can be used because it is immaterial that the product, 2,6-dichloro-4-nitroaniline, may precipitate. Advantageously, however, sufficient ethylene dichloride should be used to keep the intermediate 2-chloro-4-nitroaniline from precipitating and for this purpose it is desirable to keep the concentration of 4-nitroaniline below about 200–220 g./liter of ethylene dichloride. Thus, under optimum conditions, the concentrations of 4-nitroaniline can range from about 5 g. to about 200–220 g./liter of ethylene dichloride, or from about 0.5% to about 15%.

The amount of chlorine also is not critical. However, one of the advantages of the process is that all the chlorine introduced reacts with the 4-nitroaniline so that excellent yields are obtained with the stoichiometric amount of chlorine, i.e., two moles of chlorine per mole of 4-nitroaniline. If desired, however, a small excess, say up to 10 to 20%, can be used.

The chlorination proceeds effectively at temperatures ranging from about 20° C. to about 76° C., the reflux temperature. Advantageously, the temperature during the initial part of the reaction is maintained at about 50–60° C. At lower temperatures, the reaction takes too long and at higher temperatures, at least during the initial part of the reaction, loss of chlorine and violent boiling may take place. Toward the end of the reaction, the temperature may, if desired, be raised to the reflux temperature. In any event, after the reaction is complete, the organic phase is separated from the water phase, either by decantation or distillation as described above, and allowed to cool with stirring to crystallize the 2,6-dichloro-4-nitroaniline. The yellow slurry, thus obtained, is filtered or otherwise treated to separate the product crystals. If desired, the mother liquor, with or without a second crystallization, can be recycled to the reaction.

If desired, the process can be carried out in a continuous manner by continuously flowing up a reaction column 4-nitroaniline, chlorine, water, recycled mother liquor, and makeup ethylene chloride, proportioned as given above, and continuously withdrawing the product from the top of the reaction column, separating the two phases, feeding the organic phase to a crystallizing column, withdrawing a slurry of crystals therefrom to a filter, recycling the filtrate and other in-process solutions, and drying the recovered crystals.

The invention may be more fully understood by referring to the following example. The parts herein are by weight, unless otherwise specified.

EXAMPLE

A slurry of 105 parts of p-nitroaniline in 1884 parts of ethylene dichloride is placed in a reactor equipped for reflux and with means for sparging chlorine into the reaction mixture. 278 parts of water is added and then 108 grams of chlorine gas is sparged into the reaction mixture while cooling to keep the temperature below 55° C. The reaction mixture is then heated to reflux (76° C.) and the two phases are separated. The ethylene dichloride phase is cooled to 5–10° C. to effect crystallization of 2,6-dichloro-4-nitroaniline and filtered. The filter cake is washed with 126 parts of cold ethylene dichloride and dried in vacuum at 60° C. There is thus obtained a 94% yield of 2,6-dichloro-4-nitroaniline. The combined filtrate and wash is set aside for recycle. The aqueous phase containing about 17% hydrogen chloride is discarded. The product assays 98% 2,6-dichloro-4-nitroaniline, 0.03% 4-nitroaniline, 2% 2-chloro-4-nitroaniline, and 0.2% chloranil. The crystals of product have an average particle size of about 150 microns, which is about ten times as large as the crystals obtained by the prior art hydrochloric acid process.

I claim:

1. A process for making 2,6-dichloro-4-nitroaniline which comprises chlorinating 4-nitroaniline in ethylene dichloride with chlorine at a chlorinating temperature between about 20° C. and about 76° C. and continuously absorbing in water the hydrogen chloride formed in the reaction as it is formed, the amount of water being sufficient to keep the concentration of the hydrochloric acid solution thus formed below about 25% hydrogen chloride and the amount of ethylene dichloride being sufficient to keep all of the 2,6-dichloro-4-nitroaniline in solution.

2. The process of claim 1 in which from about 2 to about 4 parts of water for each part of 4-nitroaniline is employed.

3. The process according to claim 2 in which the concentration of 4-nitroaniline is from about 0.5 to about 15%.

4. In a process for making 2,6-dichloro-4-nitroaniline in a water-immiscible inert solvent, the method of preventing the precipitation of monochloro-4-nitroaniline which comprises chlorinating 4-nitroaniline in ethylene dichloride with chlorine at a chlorinating temperature between about 20° C. and about 76° C. in the presence of sufficient water to dissolve the hydrogen chloride of the reaction as fast as it is formed and to keep the concentration of the hydrochloric acid solution thus formed below about 25% hydrogen chloride, the amount of ethylene dichloride being sufficient to keep all of the 2,6-dichloro-4-nitroaniline in solution.

5. The process of claim 4 in which the ratio of water to 4-nitroaniline is betwen about 2:1 and about 4:1.

6. The process of claim 5 in which the concentration of 4-nitroaniline is from about 0.5 to about 15%.

7. The process of claim 6 in which the ratio of water to 4-nitroaniline is between about 2.4:1 and about 2.9:1.

8. The process of claim 7 in which the reaction temperature is about 50–60° C.

9. The process of claim 7 in which the concentration of 4-nitroaniline is between about 0.5 and about 6%.

10. The process of claim 9 in which the aqueous phase is removed from the reaction mixture by decantation.

References Cited

Litvinenko et al.: Chem. Abs., vol. 51, 1957, p. 5008e.

CHARLES B. PARKER, *Primary Examiner.*

P. C. IVES, *Assistant Examiner.*